United States Patent Office 3,592,941
Patented July 13, 1971

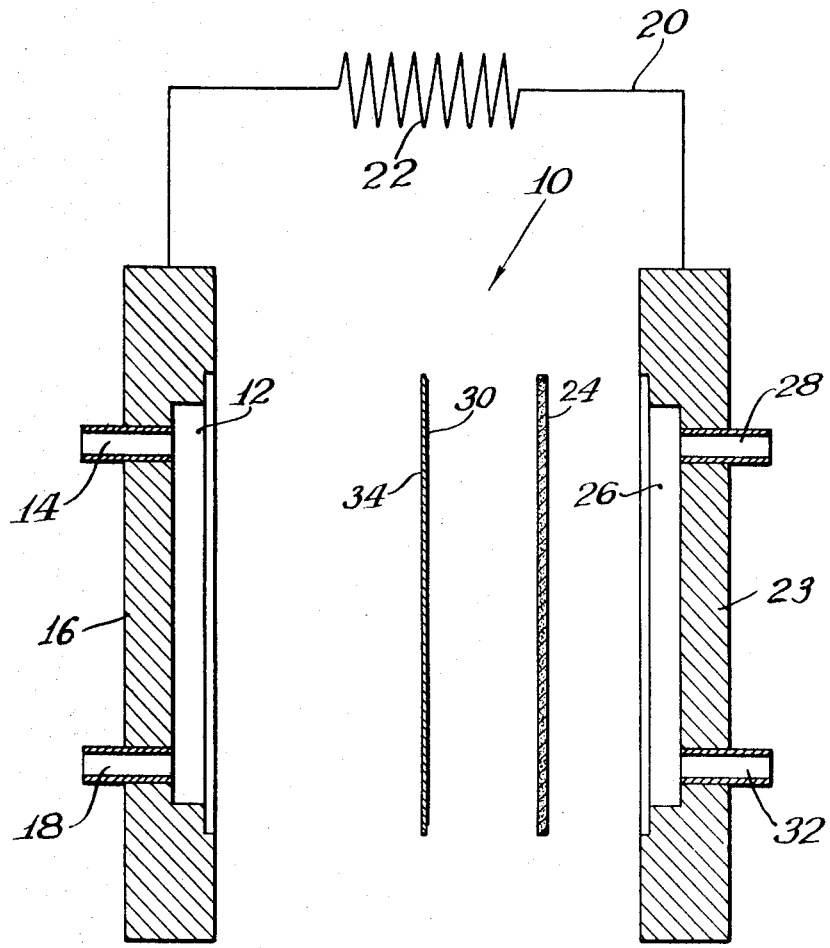

3,592,941
METHOD FOR PRODUCING ELECTRON FLOW IN CARBONATE ELECTROLYTE FUEL CELL
Eugene B. Shultz, Jr., Ballwin, Mo., and Leonard G. Marianowski, South Holland, Ill., assignors to American Gas Association, Inc., New York, N.Y.
Continuation of abandoned application Ser. No. 305,971, Sept. 3, 1963. This application Dec. 26, 1967, Ser. No. 693,306
Int. Cl. H01m 27/06
U.S. Cl. 136—86
3 Claims

ABSTRACT OF THE DISCLOSURE

A fuel cell which utilizes hydrogen as fuel to produce electrical energy having an anode only permeable by hydrogen, a cathode permeable by an oxygen containing oxidant, and an alkaline carbonate electrolyte. The internal electril circuit utilizes only the carbonate ions from the alkaline carbonate for transporting electrons, internal of the cell, from the cathode to the anode where they are released as electrical energy. The method of producing electricity using the apparatus described comprises (1) heating the fuel cell apparatus to above the melting point of the alkaline carbonate, (2) allowing hydrogen fuel to permeate the anode and react with carbonate ions in the electrolyte thereby releasing electrons as electrical energy, and (3) providing an oxygen containing oxidant at the cathode in sufficient excess to provide oxygen atoms which combine with the carbon dioxide created at the anode and thereby produce carbonate ions at the cathode. The resultant reactions provide a carbon dioxide-carbonate ion balance internal of the fuel cell.

CROSS REFERENCE TO RELATED APPLICATIONS

This a continuation of our U.S. patent application Ser. No. 305,971, filed Sept. 3, 1963, now abandoned.

BACKGROUND OF THE INVENTION—FIELD OF THE INVENTION AND DESCRIPTION OF THE PRIOR ART

This invention relates to improved fuel cells wherein cathodes, electrolytes and selectively permeable anodes are used, and it particularly relates to improved fuel cells utilizing molten alkali carbonate electrolytes. This invention further relates to a method for producing electron flow in such a fuel cell.

In the construction of a fuel cell utilizing a molten alkali carbonate electrolyte, not only is it required that a fuel and an oxidant be supplied to the cell, but carbon dioxide is also required for completing the cell reaction. The requirement of carbon dioxide is consider to be highly disadvantageous for a number of reasons. First, extra equipment, as carbon dioxide pressure cylinders and metering equipment, is required, thereby undesirably increasing the cost of the fuel cell. Furthermore, in order to attain optimum output for the cell, three gases, rather than just two, must be added to the cell in the appropriate ratios; if, for example, too much or too little carbon dioxide is added to the cell, or, in other words, if stoichiometric quantities of carbon dioxide are not added to the cell, the electrical energy output of the cell is inhibited. Therefore, it would be highly advantageous if a molten alkali carbonate fuel cell could be provided wherein the disadvantages of supplying carbon dioxide from an external source could be prevented.

SUMMARY OF THE INVENTION

It is therefore an important object of this invention to provide a fuel cell, utilizing a molten alkali carbonate electrolyte, wherein the necessary carbon dioxide is provided through an internal recirculation system created by an impermeable hydrogen diffusion membrane.

It is also an object of this invention to provide a fuel cell, utilizing a molten alkali carbonate electrolyte, wherein the cathode is porous and no external source of carbon dioxide is necessary.

It is a further object of this invention to provide a fuel cell and a method for producing electron flow in the fuel cell wherein the cell uses molten alkali carbonate electrolytes and stoichiometric amounts of carbon dioxide are maintained continuously and automatically at the cathode at all times.

It is another object of this invention to provide a molten alkali carbonate type fuel cell and a method of providing electron flow therein wherein only the fuel and oxidant are added from an external source, the required amount of carbon dioxide being provided by internal re-circulation thereof.

It is an additional object of this invention to provide a molten alkali carbonate type fuel cell which is substantially more economical to construct than conventional fuel cells of the same type.

It is still another object of this invention to provide a molten alkali carbonate type fuel cell which is operated more simply than conventional fuel cells of the same type since only two gases, rather than three gases, are supplied to the cell from an external source.

Further purposes and objects of this invention will appear as the specification proceeds.

An important aspect of the present invention is to provide a fuel cell which includes an internal circuit, an external circuit, and means for interconnecting the internal and external circuits. The cell includes an electrolyte and an anode for receiving electrons from a fuel. The anode is permeable only to the passage of hydrogen ions. A cathode is also provided and receives electrons from the external circuit. The electrolyte defines means for transporting carbonate ions to, but not through, the anode from the cathode for reaction with the hydrogen ions at the interface between the electrolyte and the anode to produce carbon dioxide, and the electrolyte also defines means for transporting the carbon dioxide away from the anode and to the cathode for reaction with the electrons and the oxygen to produce the carbonate ions, all of the carbon dioxide needed for the reaction of the cathode being supplied from the carbon dioxide produced at the anode.

BRIEF DESCRIPTION OF THE DRAWINGS

A specific embodiment of the present invention is illustrated in the accompanying drawing wherein there is shown a diagrammatic, exploded view of one of our fuel cells.

DESCRIPTION OF THE PREFERRED EMBODIMENT

Referring to the accompanying drawing of the fuel cell 10, fuel enters the anode room or compartment 12 through the inlet 14. The anode room 12 is formed in the metal current collecting grid 16. Excess fuel or other materials, which do not enter into the cell reaction, are discharged through the outlet 18.

The fuel used is hydrogen or a fuel from which hydrogen may be obtained, such as the higher paraffin hydrocarbons, methane, natural gas, etc. It is important only that hydrogen be present. The actual formation of the hydrogen may take place either out of the cell 10 or in the cell, as in the anode compartment 12; conventional methods for generating the hydrogen may be utilized. As will be described hereinafter in more detail, electrons are passed to the grid 16 and thence to the external circuit 20.

The electrons move along the external electrical circuit 20, wherein work may be performed as at the resistance 22. The electrons then continue to another current collecting grid 23 and to the cathode 24 where the electrons are released to the oxidant entering the cathode room 26 through the inlet 28.

The cathode 24 receives the electrons from the external circuit 20, and ionizes the oxidant being introduced to the cathode room 26. Preferably, a porous silver cathode or a porous lithiated nickel oxide cathode is used. Also gold may be used as a cathodic material. The porosity of the cathode may have a range of about 35–85%, although higher porosities, as 85%, are preferred since more favorable mass transfer conditions are possible.

The oxidant which is supplied to the cathode room 26, when a molten alkali carbonate electrolyte 30 is used, is a combination of oxygen, or a gas containing oxygen or oxygen ions, and carbon dioxide. The electrolyte 30 may be applied as a coating to the cathode 24 or to the anode membrane 34, the important function of which will be subsequently described. Alternatively, the electrolyte 30 may be formed separate from either the cathode 24 or the anode membrane 34.

Although the electrolyte 30 may be in the liquid form in the cell 10, it is preferred that electrolyte 30 be made in accordance with the molten alkali carbonate electrolyte described in patent application Ser. No. 96,877. Such a molten alkali carbonate electrolyte includes a porous refractory disc or matrix impregnated with mixtures of sodium, lithium and/or potassium carbonates. The porosity of the molten carbonate electrolyte has a range of about 1–30%. The porous disc retains the molten electrolyte surface tension, and magnesium oxide or other suitable inert, ceramic materials that can be sintered into strong, thin, porous, matrices may be used. Although any molten carbonate or carbonate mixture may be employed, it is preferred to use mixtures of carbonates with lower melting points, such as the binary lithium-sodium carbonate eutectic (M.P about 500° C.) or the ternary lithium-sodium-potassium carbonate eutectic (M.P. about 397° C.). It is also feasible to use quaternary mixtures of lithium-sodium potassium-calcium carbonates which have even lower melting points.

When the molten alkali carbonate electrolyte 30 is used in the fuel cell 10, the following electrochemical reactions occur:

At the cathode: $2e^- + CO_2 + \frac{1}{2}O_2 \rightarrow CO_3^=$
At the anode: $H_2 + CO_3^= \rightarrow H_2O + CO_2 + 2e^-$
Overall: $H_2 + \frac{1}{2}O_2 \rightarrow H_2O$ The mechanism of electron transport through the electrolyte 30 is by means of the carbonate ions ($CO_3^=$) which are formed at the cathode 24. The internal circuit of the cell is completed at the interface of the metal membrane 34 and the electrolyte 30, where the hydrogen is galvanically burned, or, in other words, where the carbonate ions and hydrogen react to form the reaction products of gaseous water or steam and carbon dioxide, while electrons are released to the anode membrane 34.

The metal anode membrane 34 permits the passage of hydrogen only, while preventing the passage of inerts or oxidant molecules. The membrane 34 is preferably constructed of certain noble metals, such as palladium, nickel, or alloys of palladium with small amount of silver. Since the purpose of the electrolyte 30 is to permit the passage of carbonate ions when a molten alkali carbonate electrolyte is used, the internal circuit of the fuel cell 10 is completed when hydrogen, which passes through the noble metal anode membrane 34, reacts with the carbonate ions at the noble metal electrolyte interface.

As previously mentioned, when a molten alkali carbonate electrolyte 30 is used, products of the reaction of hydrogen with carbonate ions are carbon dioxide and gaseous water. Since the hydrogen diffusion membrane 34 is permeable only to hydrogen, the gaseous reaction products diffuse back through the electrolyte 30, or bubble through the electrolyte in the event that it is contained in the cell while in a liquid state, toward the cathode room or compartment 26, and the steam or gaseous water passes outwardly through the outlet 32. However, since carbon dioxide is required along with oxygen in a molten alkali carbonate fuel cell, the carbon dioxide formed at the anode membrane 34 is utilized in the cell reaction. Thus, the required carbon dioxide is supplied to the cell 10 by means of an internal recirculation system created by the hydrogen diffusion membrane 34. By this internal recirculation of carbon dioxide, a stoichiometric amount of carbon dioxide is maintained continuously and automatically at the cathode 24 at all times. Thus, the use of the anode membrane 34 avoids the necessity of providing an external source of carbon dioxide, which is both expensive and complicates the operation of the cell The noble metal membrane 34, although preferably constructed of palladium nickel or a palladium-silver alloy, may also be constructed of other metals of Group VIII (iron, cobalt, nickel, ruthenium, rhodium, palladium, osmium, iridium, platinum) as well as metals of Group IV–B (titanium, zirconium, hafnium), V–B (vanadium, niobium, tantalum) and I–B (copper, silver, gold). Since the rate of hydrogen diffusion through such foils is inversely proportional to the thickness of the foil, thin foils are preferred for high rates of diffusion Preferably, the foils have a thickness of about 0.001–0003 inch. Actually, the lower limit of foil thickness is limited only by the requirement of providing a continuous hole-free foil. In the event that mechanical support is required for the noble metal foil, an inert porous support may be used, such as perforated metal, expanded metal, or a porous ceramic.

A number of tests of the fuel cell 10 were made wherein hydrogen was used as the fuel and flue gas was used as the oxidant. The anode membrane 10 was constructed of either palladium, or a palladium-silver alloy. The electrolyte had one surface painted with silver, which served as the cathode. The construction was then placed between metal current collecting grids. The assembly was housed in fuel cell flanges containing passages for flow of fuel past the anode and flow of oxidant past the cathode. The complete housing was then placed in a gas-fired furnace to maintain a 600° C. operating temperature.

Table I lists the results obtained from these tests:

TABLE I

| Run No. | Anode | Cathode | Electrolyte | Test length (hours) | Fuel | Oxidant |
|---|---|---|---|---|---|---|
| 1 | Palladium-silver alloy. | Silver paint film. | 70 wt. percent MgO, 30 wt. percent alkali carbonate eutectic. | 300 | $H_2$ | Flue gas. |
| 2 | do | do | do | 5,005 | $H_2$ | Do. |
| 3 | do | do | do | 1,475 | $H_2$ | Do. |
| 4 | do | do | do | 5,000 | $H_2$ | Do. |
| 5 | do | do | do | 2,205 | $H_2$ | Do. |
| 6 | do | do | do | 414 | $H_2$ | Do. |
| 7 | Palladium | do | do | 529 | $H_2$ | Do. |
| 8 | do | do | do | 400 | $H_2$, $H_2+CO_2$ | Do. |
| 9 | do | do | do | 1,630 | $H_2$, $H_2+CO_2$, $H_2+CO$ | Do. |

As an example of a typical performance of the above mentioned cells, the cell used in Run No. 2 performed as follows:

| Voltage: | Current density, ma./sq. cm. |
|---|---|
| 0.89 | 0 |
| 0.63 | 25 |
| 0.52 | 50 |
| 0.22 | 80 |

Utilizing a similar arrangement, a 1 mil thick nickel foil was used as the combination anode-hydrogen diffusion membrane. The test was maintained at 500° C., flue gas was used as the oxidant and a gas comprising 80% hydrogen and 20% carbon dioxide was used as the fuel. The test length was 64 hours and the cell performed as follows:

| Voltage: | Current density, ma./sq. cm. |
|---|---|
| 0.92 | 0 |
| 0.63 | 15 |
| 0.44 | 25 |

While in the foregoing there has been provided specific details of construction of particular embodiments of the present invention, it is to be understood that all equivalents obvious to those having skill in the art are to be included within the scope of the invention as claimed.

What we claim and desire to secure by Letters Patent is:

1. A method for producing electron flow in an external electrical circuit by use of an electrolytic fuel cell of the type having an anode, a cathode, a molten alkaline carbonate electrolyte between said anode and said cathode, said anode and said cathode being interconnected by an external electrical circuit, said method comprising, in combination, the steps of continuously passing a hydrogen source to said anode, removing electrons from said hydrogen and said anode for transfer of said electron to said external circuit, passing hydrogen ions only through said anode to said molten alkaline carbonate electrolyte, passing an oxygen containing gas to said cathode, transferring said electrons in said external circuit to said cathode, reacting said oxygen, a stoichiometric amount of carbon dioxide, and said electrons at said cathode to produce carbonate ions, transporting said carbonate ions through said electrolyte to said anode, reacting said hydrogen ions and said carbonate ions at the interface between said electrolyte and said anode to produce carbon dioxide in situ, preventing the passage of said carbon dioxide through said anode, and transporting said carbon dioxide through said electrolyte to continuously supply said stoichiometric amount of carbon dioxide at said cathode at all times, said in situ produced carbon dioxide being all the carbon dioxide needed for the reaction at said cathode.

2. The method of claim 1 wherein an anode permeable to the passage of hydrogen ions is provided for passing said hydrogen ions through said anode for preventing the passage of said carbon dioxide through said anode.

3. The method of claim 2 wherein said anode is provided as a metal membrane constructed of palladium, nickel, or a palladium-silver alloy.

References Cited
UNITED STATES PATENTS

| 2,384,463 | 9/1945 | Gunn et al. | 136—86 |
| 3,239,383 | 3/1966 | Hauel | 136—86 |
| 3,321,333 | 5/1967 | Palmer | 136—86 |
| 3,372,061 | 3/1968 | Forten | 136—86 |
| 3,407,094 | 10/1968 | Juda | 136—86 |

FOREIGN PATENTS

| 222,283 | 12/1957 | Australia | 136—86 |

ALLEN B. CURTIS, Primary Examiner